Figure 1:
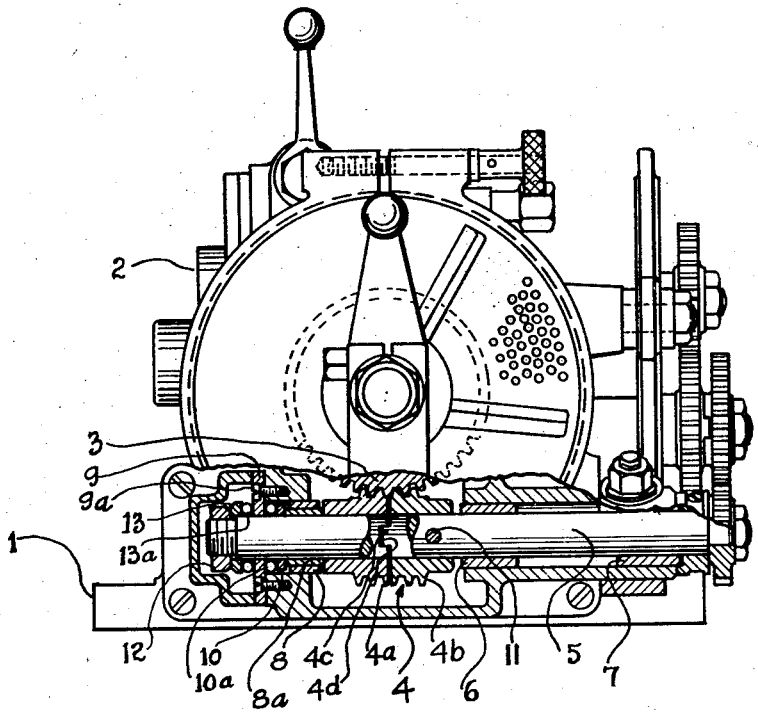

May 28, 1935.  W. M. POHL  2,002,644

ADJUSTABLE WORM GEARING

Filed July 8, 1933

Patented May 28, 1935

2,002,644

UNITED STATES PATENT OFFICE 2,002,644

ADJUSTABLE WORM GEARING

Walter M. Pohl, Wauwatosa, Wis., assignor to Kearney & Trecker Corporation, West Allis, Wis.

Application July 8, 1933, Serial No. 679,454

5 Claims. (Cl. 74—400)

This invention relates to worm gearing and more particularly to a construction thereof which is adapted for, and capable of, being adjusted to maintain a desired degree of fit between the worm and mating gear.

An object is to provide improved worm gearing in a form permitting of adjustment to take up wear while insuring that the proper tooth contact be maintained, of maximum area and resistance to wear.

A further object is to provide improved worm gearing capable of an adjustment to take up lost motion or wear without disturbing the relationship of the gear axes.

A further object is to provide a worm, split for adjustment along a plane perpendicular to its axis, and in a form such that the driving contact thereof with the worm wheel will be all in one portion for one direction of thrust and all in the other portion for the other direction of thrust.

A further object is to provide an adjustable worm and wheel gearing of such construction that repeated adjustments thereof effect an improvement over initial conditions, both as to accuracy of relative angular velocity and as to the engaged thrust surface of the gearing.

Another object is to improve thrust mounting for worm gearing which is adjustable to take up wear or back-lash, whereby to provide a thrust bearing and worm in such combination that a single adjustment is sufficient to predetermine the running conditions both between the worm and its gear, and between the worm and its thrust abutment.

Another object is generally to improve and simplify the construction and operation of worm gearing, and still other objects will be apparent from the specification.

The invention consists in the construction and arrangement of parts as herein illustrated, described, and claimed and in such structure as may be equivalent to the structure claimed.

In the drawing like reference characters have been used in each view, in which:

Fig. 1 shows the improved worm and wheel structure, and a mounting therefor, in an illustrative device where the improvements herein contemplated are particularly important namely, in the train for the movement of a dividing head spindle. In a dividing head it is very essential that all lost motion should be eliminated between the worm and wheel thereof, and that the relative angular velocity be as uniform as possible to provide accurate indexing, and that the thrust surfaces be of maximum area.

Figure 2:
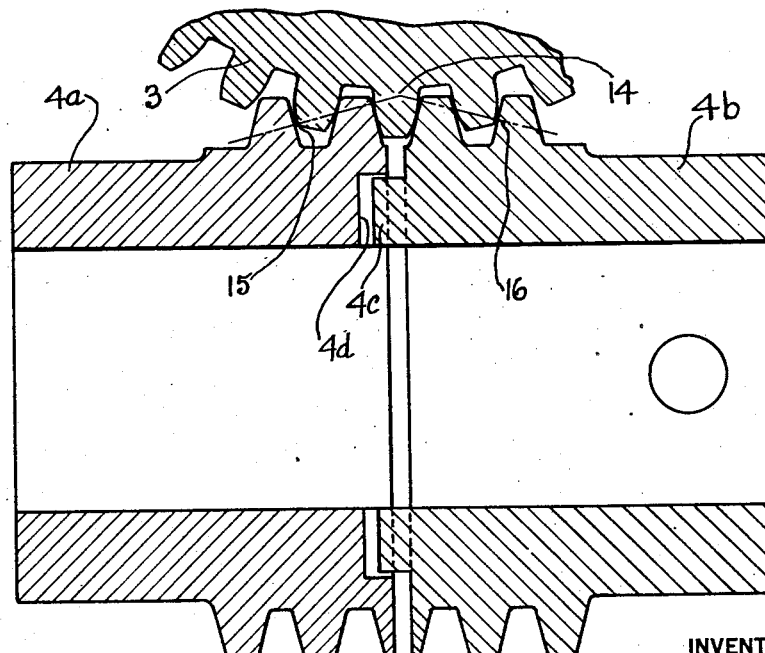

Fig. 2 shows an enlarged section through the worm and wheel shown in Fig. 1.

The dividing head shown in Fig. 1 is, except for the construction of the worm and wheel, and the worm mounting, the same as that disclosed in a copending application of Edward J. Kearney and Joseph B. Armitage, Serial No. 659,828, filed March 6, 1933. A base 1 carries a rotatable spindle 2, and indexing mechanism including a worm and worm wheel which, in this case, consists of a worm wheel 3 and a worm 4 having portions 4a and 4b relatively axially adjustable being slidably keyed with one another by the means of a key or clutch member 4c on the one worm portion and engaging a slot 4d in the other portion.

The worm 4 is carried by a shaft 5 which is provided with bearings consisting of the bearings 6, 7 at the one end of the shaft, and a bearing 8 at the other end, the shaft being provided with a bearing sleeve 8a in the bearing 8. A thrust plate 9 is fixed with the worm housing as by screws such as 9a, and limits the axial movement of worm portion 4a to the left in Fig. 1, the worm portion abutting the bearing sleeve 8a which in turn abuts a race plate 10 to react against thrust plate 9 through suitable anti-friction balls or similar elements 10a, the shaft being closely but slidably fitted with each of the members. Thrust plate 9 also limits the axial movement of the worm portion 4b to the right in Fig. 1, the worm portion being fixed with the shaft as, for instance, by a pin 11 and the shaft being prevented from movement to the right by an adjustable nut member 12, a race plate 13 and suitable anti-friction balls or similar elements 13a. Each of the worm portions 4a, 4b is prevented from axial movement in the other direction by the engagement of the worm threads with the worm wheel 3.

It will be clear that, with the construction shown, the two portions of the worm may be relatively adjusted axially by an adjustment of the nut 12. This may be done initially to provide any desired degree of lost motion between the teeth of the mating gears, and the worm portions may later be adjusted at any time to alter the degree of lost motion or take up wear.

The teeth or threads of worm 4, as here shown, are of a form such that in an axial section the teeth correspond to a rack in which the sides of the teeth intended for worm wheel contact are substantially straight lines, as shown in Fig. 2. Also the form of the engaged teeth is such that, instead of the thrust contact engagement for either thrust direction taking place, as is ordinarily the case, over a line of action extending for some distance along the worm axis in each direction from the point where the wheel pitch cylinder is tangent to the worm pitch plane, which would normally be at a point about half way between the tops and bottoms of the engaged teeth, the entire thrust contact engagement for the one thrust direction takes place at the one side of said tangent point along the worm axis, and for the other thrust direction takes place at the other side of the tangent point, whereby the thrust contact for either thrust direction is, in applicant's device, confined to the one or the other of the worm portions 4a or 4b. This result may be accomplished by forming the gears for the worm pitch plane to stand at either a substantially greater distance than normal from the worm axis, or a substantially less distance. As stated above, the worm pitch plane normally lies half way between the top and bottom of the threads but it may be readily demonstrated that, where the wheel is of comparatively large diameter, it is a decided improvement over the usual construction to position the worm pitch plane to stand closer to the axis, as, for instance, tangent to a cylinder having its axis coinciding with the worm axis and of a diameter equivalent to the root diameter of the threads, and that where the wheel is of relatively small diameter, it is a decided improvement over the usual construction to make the worm pitch plane tangent to a cylinder of larger diameter, as, for instance, tangent to a cylinder of a diameter equal to the outside diameter of the worm. In the present device since the worm wheel is relatively small, being only a few times larger than the worm diameter, the worm pitch plane is tangent to a cylinder of a diameter approximately corresponding to the outer diameter of the worm, whereby the point of tangency of the worm pitch plane and the wheel pitch cylinder is approximately at point 14, Fig. 2, and the line of tooth action of the gearing for thrust in one direction extends from point 14 approximately to point 15, and, for the other thrust direction, from the point 14 approximately to the point 16, from which it will be readily seen that the thrust contact in the first mentioned thrust direction is limited to the worm portion 4a and in the other thrust direction is limited to the worm portion 4b.

The altering of the position of the worm pitch plane has a variety of advantages for applicant's purposes. The area of opposed thrust surfaces is initially larger in either thrust direction than would be the case with the usual or normal position of the pitch plane and, moreover, an adjustment of the one worm portion relative to the other does not reduce the thrust surface area available. With the usual position of the pitch plane where, as previously mentioned, a part of the thrust in each direction is taken in the worm portion to the left of point 14, Fig. 2, and a part is taken in the other portion to the right of point 14, it must obviously occur that if one portion of the worm is adjusted relative to the other, the thrust surface in the one or the other portion will no longer be available, and the total available thrust surface is thereby very materially reduced, thus causing rapid wear of the remaining surface.

In practice the split worm is made of a material much more resistant to wear than that of the worm wheel. The reason for this is of particular significance in the present structure as follows: The worm threads or teeth, and especially the straight line contact form of the worm teeth previously described, can be generated with substantially perfect accuracy with little practical difficulty, whereas the worm wheel teeth are much more difficult. With an initially accurate worm and with substantially all the wear confined to the worm wheel, it results that, in the use of this device, the worm adjustment corrects any initial inaccuracy in the worm wheel and the device improves with use and adjustment, both as to accuracy and area of thrust surface. This feature is extremely important in many uses as, for instance, in the indexing train of dividing heads.

Having now disclosed the invention, what is claimed is:

1. In a worm and wheel gearing, the combination of a worm having threads of substantially equal diameter along its axis, whereby the pitch plane thereof is tangent to a cylinder and the tops and roots of worm threads of equal depth coincide respectively with two cylinders of unequal diameter, said worm being constructed in two relatively adjustable portions differently spaced along said axis, and means for relative adjstment of said portions, said gearing being formed with said pitch plane cylinder substantially corresponding with one of said unequal diameter cylinders, whereby the driving contact in one thrust direction is substantially wholly in one of said worm portions and in the other thrust direction is substantially wholly in the other of said worm portions and the adjustment of said portions does not materially reduce the working thrust bearing surface between said worm and wheel.

2. In a worm and wheel gearing, the combination of a worm having threads of substantially equal diameter along its axis, whereby the pitch plane thereof is tangent to a cylinder and the tops and roots of worm threads of equal depth coincide respectively with two cylinders of unequal diameter, said worm being constructed in two relatively adjustable portions differently spaced along said axis, and means for relative adjustment of said portions, said gearing being formed with said pitch plane cylinder substantially corresponding with one of said unequal diameter cylinders whereby the driving contact in one thrust direction is substantially wholly in one of said worm portions and in the other thrust direction is substantially wholly in the other of said portions and the adjustment of said portions does not materially reduce the working thrust bearing between said worm and wheel, said worm threads being such that in a section along a plane coinciding with the worm axis said threads have straight line contact faces.

3. In a worm and wheel gearing, the combination of a worm having threads of substantially equal diameter along its axis, whereby the pitch plane thereof is tangent to a cylinder and the tops and roots of worm threads of equal depth coincide respectively with two cylinders of unequal diameter, said worm being constructed in two relatively adjustable portions differently spaced along said axis, and means for relative adjustment of said portions, said gearing being formed with said pitch plane cylinder substantially corresponding with the larger of said unequal diameter cylinders whereby adjustment of said portions may be had without a reduction in effective thrust area between said worm and wheel.

4. In a worm and wheel gearing, the combination of a worm having threads of substantially equal diameter along its axis, whereby the pitch plane thereof is tangent to a cylinder and the tops and roots of worm threads of equal depth coincide respectively with two cylinders of unequal diameter, said worm being constructed in two relatively adjustable portions differently spaced along said axis, and said gearing being formed with said pitch plane cylinder of a diameter different than the mean diameter of said unequal diameter cylinders, sufficiently to effect thrust surfaces between said worm and wheel substantially wholly in the one worm portion for the one thrust direction and vice versa.

5. In a worm and wheel gearing, the combination of a worm having threads of substantially equal diameter along its axis, whereby the pitch plane thereof is tangent to a cylinder and the tops and roots of worm threads of equal depth coincide respectively with two cylinders of unequal diameter, said worm being constructed in two relatively adjustable portions differently spaced along said axis, said gearing being formed with said pitch plane cylinder of a diameter different than the mean diameter of said unequal diameter cylinders sufficiently to effect thrust surfaces between said worm and wheel substantially wholly in the one worm portion for the one direction of thrust and vice versa, and said worm threads being such that in a section along a plane coinciding with the worm axis said threads have straight line contact faces.

WALTER M. POHL.